United States Patent [19]

Kamada

[11] Patent Number: 5,340,636
[45] Date of Patent: Aug. 23, 1994

[54] MAGNETIC RECORDING MEDIUM

[75] Inventor: Koh Kamada, Kanagawa, Japan

[73] Assignee: Fuji Photo Film Co., Ltd., Kanagawa, Japan

[21] Appl. No.: 974,696

[22] Filed: Nov. 12, 1992

Related U.S. Application Data

[63] Continuation of Ser. No. 726,424, Jul. 5, 1991, abandoned.

[30] Foreign Application Priority Data

Jul. 5, 1990 [JP] Japan .................. 2-178443

[51] Int. Cl.$^5$ .................. B32B 3/10; B32B 5/16; G11B 5/66
[52] U.S. Cl. .................. 428/141; 428/329; 428/694 B; 428/694 BR; 428/694 BM; 428/694 SG; 428/480; 428/900
[58] Field of Search .......... 428/900, 141, 329, 694 B, 428/694 BR, 694 BM, 694 SG, 480

[56] References Cited

U.S. PATENT DOCUMENTS

| | | | |
|---|---|---|---|
| 4,275,107 | 6/1981 | Bantkus et al. | 428/220 |
| 4,743,487 | 5/1988 | Saito et al. | 428/141 |
| 4,780,353 | 10/1988 | Takahashi et al. | 428/141 |
| 4,959,263 | 9/1990 | Aonuma et al. | 428/900 |
| 5,051,303 | 9/1991 | Noguchi et al. | 428/900 |
| 5,252,388 | 10/1993 | Murooko | 428/328 |

*Primary Examiner*—Paul J. Thibodeau
*Assistant Examiner*—Leszek Kiliman
*Attorney, Agent, or Firm*—Sughrue, Mion, Zinn, Macpeak & Seas

[57] ABSTRACT

A magnetic recording medium comprising a non-magnetic support having on at least one side thereof at least one magnetic layer, in which the magnetic layer comprises a binder having dispersed therein a ferromagnetic powder and the non-magnetic support has a coarse projection density of not more than 400 per 500 mm$^2$, a surface roughness (Ra) of from 0.02 to 0.07 μm (cut-off value: 0.25 mm), and a thermal shrinkage of not more than 1.0% when preserved at 100° C. for 4 hours. The magnetic recording medium has satisfactory sensitivity and frequency characteristics, freedom from output variation in the high-frequency region, and excellent running properties at ordinarily temperature and ordinary humidity with a reduced rate of running stop.

4 Claims, 2 Drawing Sheets

MAGNETIC RECORDING MEDIUM

This is a continuation of application Ser. No. 07/726,424 filed Jul. 5, 1991 now abandoned.

FIELD OF THE INVENTION

This invention relates to a magnetic recording medium, and more particularly to a magnetic recording medium using a polyester film which exhibits sufficient running properties as audio tape suitable for not only indoor use in general audio cassette tape decks but outdoor use in portable tape recorders or automobile audio sets (so-called car stereo).

BACKGROUND OF THE INVENTION

Magnetic recording media such as audio cassette tape and video cassette tape have conventionally been used or stored in environments with a mild temperature change, for example in rooms. With the recent spread of radio-cassette players, automobile audio sets, small-sized video tape recorders, etc., use of magnetic recording media in high temperature or low temperature environments such as outdoors or in automobiles has been extending. For example, it was reported that the highest maximum of the temperature in automobiles reaches 104° C. at daytime in high summer according to JIS D0204 (High and low temperature test method of automobile parts).

When exposed to such high temperatures, magnetic recording media undergo curling due to shrinkage. Shrinkage may occur in one edge to a greater degree to cause arching in the lengthwise direction, or the increased winding force due to shrinkage causes deformation of the hub. Thus, if a magnetic recording medium on which music, for example, is recorded is exposed to a high temperature, the output level on reproduction greatly varies, failing to normally reproduce the recorded signals. Besides, the tape refuses to run smoothly. These problems arising from shrinkage are particularly conspicuous in magnetic recording media in which a thin support is used so as to have an increased length to be packed in an audio or video cassette shell (sometimes called cassette half) and the number of turns in winding up around the hub is so much increased, such as audio compact cassettes C-80, C-90 and C-120.

Further, magnetic recording media using a flexible support having too a smooth surface turned out to have poor running performance on repeated use.

Various proposals have hitherto been made to provide a magnetic recording medium which has satisfactory running properties on repeated use and undergoes no great deformation due to thermal shrinkage on exposure to high temperatures thereby assuring output level stability and dimensional stability. For example, JP-A-59-132421 (the term "JP-A" as used herein means an "unexamined published Japanese patent application") proposed a magnetic recording medium using a support having a surface roughness (Ra) of from 0.01 to 0.1 μm on the side opposite to a magnetic layer and having a thermal shrinkage of not more than 1% when allowed to stand in an atmosphere of 110° C. for 4 hours. The proposal has accomplished some improvement on thermal shrinkage of magnetic tapes or supports.

However, it has been found by further studies that the surface roughness (Ra) of a support should be more strictly limited to a range of from 0,020 to 0.070 μm, and preferably from 0.03 to 0.060 μm to obtain consistency between stable running and high output and that commercially available audio tapes comprising a polyester film having such a limited surface roughness undergoes large variations in high-frequency output. The terminology "high-frequency output variations" as used herein means output variations in the lengthwise direction of tape when signals of 10 KHz and −20 dB are recorded and reproduced. The high-frequency output variation gives such an auditory phenomenon that the volume in the high key periodically changes. According to studies of the present inventors, there is no auditory problem as far as the amplitude of high-frequency output variations is within 1.0 dB, and preferably within 0.5 dB.

SUMMARY OF THE INVENTION

An object of the present invention is to provide a magnetic recording medium having improved electromagnetic conversion characteristics and improved running properties, and more particularly a magnetic recording medium having satisfactory sensitivity and frequency characteristics, freedom from output variation in the high-frequency region, and excellent running properties at ordinary temperature and ordinary humidity with a reduced rate of running stop.

Other objects and effects of the present invention will be apparent from the following description.

The present inventors have closely examined magnetic tape which undergoes the above-described prior art problem of high-frequency output variation and, as a result, have ascertained that the portion where the output decreases has coarse projections on its magnetic surface and that such projections cause an increase of spacing loss. The present inventors have further found that the coarse projections on the magnetic surface are attributed to coarse projections on the support surface.

The present invention relates to a magnetic recording medium comprising a non-magnetic support having on at least one side thereof at least one magnetic layer, in which the magnetic layer comprises a binder having dispersed therein a ferromagnetic powder and the non-magnetic support has a coarse projection density of not more than 400 per 500 mm$^2$, a surface roughness Ra of from 0.02 to 0.07 μm where cut-off value is 0.25 mm, and a thermal shrinkage of not more than 1.0% when preserved at 100° C. for 4 hours.

In a preferred embodiment of the present invention, the ferromagnetic powder has a crystallite size of from 100 to 450Å and a coercive force (Hc) of from 500 to 1,800 Oe.

In another preferred embodiment of the present invention, the coarse projection density is not more than 200 per 500 mm$^2$, the surface roughness Ra is from 0.03 to 0.065 μm where cut-off value is 0.25 mm, and the thermal shrinkage is not more than 0.7% when preserved at 100° C. for 4 hours.

In a more preferred embodiment of the present invention, the magnetic layer has a multi-layer structure composed of at least two magnetic layers, in which the ferromagnetic powder present in the first magnetic layer has a crystallite size greater than that in the second magnetic layer by at least 30Å and a smaller coercive force than that in the second magnetic layer by at least 50 Oe.

In the present invention inclusive of the preferred embodiments, the ferromagnetic powder is preferably Co-doped iron oxide powder.

DETAILED DESCRIPTION OF THE INVENTION

Figure 1:
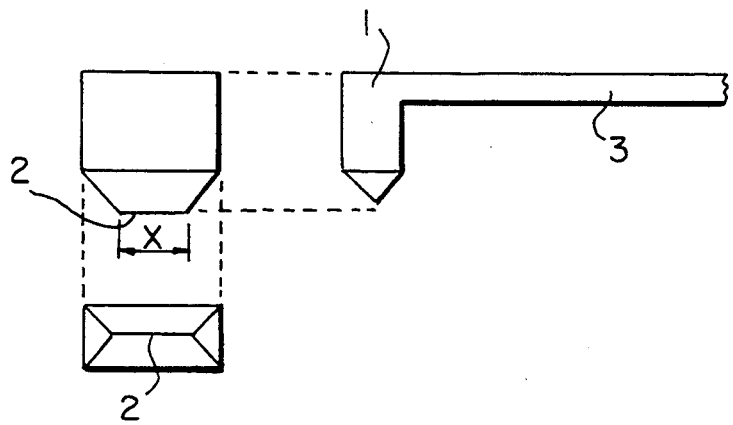
FIG. 1 is an enlarged view illustrating an example of a knife wedge type probe to be used in measurement of coarse projection density.

The terminology "coarse projections" as used herein means surface projections having a height of sextuple ring or higher in multiple interference observation. The height corresponding to single ring multiple interference observation is 0.273 $\mu$m. Considering the frequency of the coarse projections, measurements must be made over 500 mm$^2$ to obtain a reliable value. In this point of view, the coarse projection as referred to in the present invention is different in its definition from "surface projection" according to conventional art in which it is defined as a projection appearing within an area of 1 mm$^2$. The coarse projection as above defined can be rapidly measured by use of the surface roughness tester disclosed in JP-A-U-62-102106 (the term "JP-A-U" as used herein means an "unexamined published Japanese utility model application").

Measurements on commercially available polyester films having an Ra between 0.010 $\mu$m and 0.100 $\mu$m by means of the above-described surface roughness tester revealed that a coarse projection density is correlated to Ra. It was also confirmed that the high-frequency output variation of magnetic tape is correlated to the coarse projection density of the support used therein. From the results of these analyses, the present inventors have reached a conclusion that commercially available polyester films having an Ra of 0.020 $\mu$m or more, although advantageous in terms of running properties, have a coarse projection density of 200 per 500 mm$^2$ or more and therefore cause great high-frequency output variations when used as a support of audio tape.

The feature of the present invention lies in that the surface profile of a non-magnetic support should be measured over a measuring area as wide as 500 mm$^2$ and all the projections present thereon are subject to consideration, more specifically the number of coarse projections in that area is limited to 400 or less, preferably 200 or less, differing from the conventionally employed measuring method in which surface roughness of a non-magnetic support is measured within a certain cut-off value while ignoring coarse projections. If surface properties of a support are to be improved with attention being paid only to Ra evaluation, coarse projections can be reduced, but a reduction in fine surface unevenness also results so that the support has too a smooth surface and a so increased $\mu$ value (friction coefficient). To the contrary, precise evaluation of coarse projections according to the present invention made it possible to reduce the number of coarse projections while maintaining fine projections to some extent, i.e., controlling an Ra between 0.02 $\mu$m and 0.07 $\mu$m to thereby assure satisfactory running properties.

In other words, the present invention succeeded to obtain consistency between electromagnetic conversion characteristics and running properties by reducing coarse projections while retaining fine projections.

Further, there have been conflicting problems: one is that unevenness on a non-magnetic support causes unevenness on the surface of a magnetic layer formed thereon, which leads to a spacing loss and a failure of obtaining high-frequency output stability; and the other is that a non-magnetic support having an excessively smooth surface causes tightness of winding on heat application, which leads to tape deformation and a failure of maintaining satisfactory running. According to the present invention, the former problem can be settled down by reducing coarse projections of a support to which high-frequency output variation of a magnetic layer is ascribed, and the latter problem is solved probably because the fine projections on the non-magnetic support let air be present among layers of lap-wound magnetic tape and the air escapes to avoid tape deformation if tightness in winding occurs.

That is, if the magnetic tape receives tightening force during winding, the tape would slide in the longitudinal direction thereby to prevent concentration of the stress. The non-magnetic support used in the present invention is controlled to have a thermal shrinkage of not more than 1.0% when preserved at 100° C. for 4 hours so that the non-magnetic support itself may have resistance to expansion and contraction when exposed to high temperatures and exhibit dimensional stability as much as possible. Tightening in winding which may develop even when such a low-shrinkable non-magnetic support is used can be coped with by adjusting both coarse projections and fine projections of the support, thus establishing surer consistency between electromagnetic conversion characteristics and running properties.

The effects of the present invention can further be enhanced by properly selecting a crystallite size and a coercive force of a ferromagnetic powder of the magnetic layer.

The method of measuring a coarse projection density will be explained below by referring to FIGS. 1 and 2.

In FIG. 1, probe 1 has wedge 2 to contact with a film to be evaluated. The width x of wedge 2 is from 0.01 to 2 mm. Probe 1 is set on upright supporting member 4 via arm 3 in a vertically movable way in direction Z as shown in FIG. 2. That is, probe 1 is fixed to Z-axis differential transformer 5, and transformer 5 is fixed to X-axis shifter via arm 6. Arm 6 is movable in direction X (horizontal and perpendicular to the width direction of wedge 2). X-axis shifter 7 is fixed to supporting men, bet 4 in a vertically movable way in direction Z. Supporting men, bet 4 has sliding width 8 for vertically moving X-axis shifter 7 and Z-axis differential transformer 5 according to the instructions therefrom. Sliding width 8 has Z-axis level adjusting member 9 for previously setting the position of X-axis shifter 7. Movements of probe 1 in directions X and Z are under instructions from the respective controller (not shown).

Stage 10 is for mounting a sample on and is movable in directions X and Y (horizontal and perpendicular to X). In the system shown in FIG. 2, since probe 1 is horizontally movable only in direction X, stage 10 is moved in direction Y so that the entire measuring area of a sample on stage 10 may be scanned with probe 1. Not limited to the embodiment shown, the positioning system includes a system in which probe 1 is movable in both X and Y directions.

Figure 3:
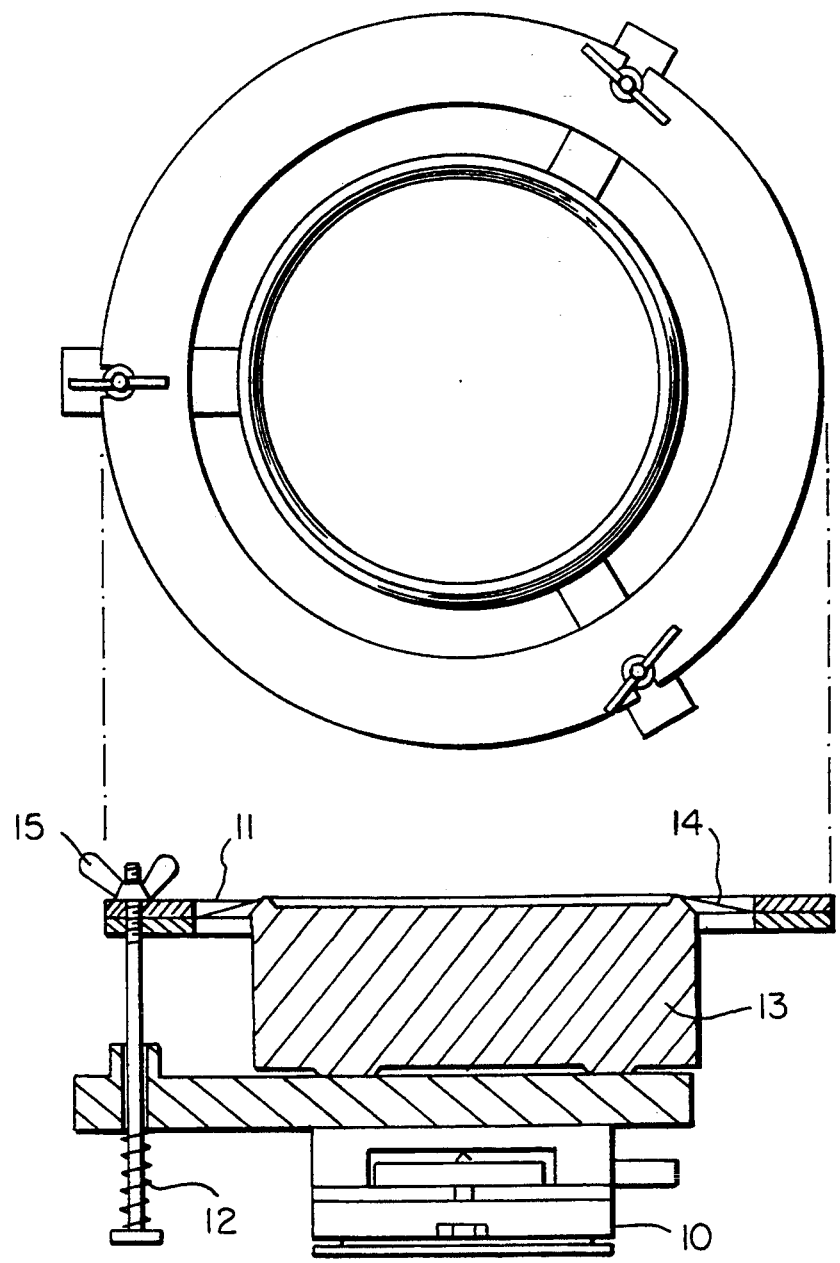
FIG. 3 is a schematic plane view and a schematic sectional view of a holder for measuring surface profile of a film.

When surface properties of a film are evaluated by means of the above-described surface roughness tester, it is preferable to use a sample holder illustrated in FIG. 3 which is fixed on stage 10.

The holder of FIG. 3 is suitable for examining surface profile of a thin film such as paper and plastic films. It comprises base block 13, a pair of fixing ring plates 11, and screw members 15 for fixing ring plates 11 to base block 13. Base block 13 has a ring flange on its upper side to form a crater in the center. Sample 14, e.g., a film, is tented on the ring flange over the crater and clamped by fixing ring plates 11 with a given space between the film and block 13. An O-ring is provided between a pair of ring plates 11, and ring plates 11 are pull down vertically by spring 12 below screw member 15 to give a tension to sample 14 and to keep the surface of sample 14 flat. The upper surface of block 13 preferably has a polish finish.

Ra values in the present invention were measured according to JIS B0601 at a cut-off value of 0.25 mm over a measuring length of 40 mm.

The non-magnetic support which can be used in the present invention includes films of plastics, such as polyesters, e.g., polyethylene terephthalate and polyethylene-2,6-naphthalate, polyolefins, e.g., polyethylene and polypropylene, cellulose derivatives, e.g., cellulose triacetate, cellulose diacetate, cellulose acetate butyrate, and cellulose acetate propionate, vinyl polymers, e.g., polyvinyl chloride and polyvinylidene chloride, polycarbonate, polyimide, and polyamide-imide; non-magnetic metals, e.g., aluminum, copper, tin, zinc, etc., alloys containing these metals, and stainless copper; paper; and paper coated or laminated with baryta or an α-polyolefin, e.g., polyethylene, polypropylene, and an ethylene-butene copolymer.

The most preferred non-magnetic support comprises a plastic film as described above having incorporated thereinto inert organic or inorganic particles, both sides of which have controlled surface roughness.

The organic or inorganic particles to be incorporated are preferably fine and massive particles. It is preferable to use particles having a relatively large size and particles having a relatively small size in combination. The former particles impart winding characteristics to a support, and the latter particles impart slipping characteristics to a support. Each of the former and latter particles preferably have a uniform particle size without scatter.

The inert inorganic particles are called non-magnetic inorganic powders and include α-alumina, Δ-alumina, silicon carbide, synthetic calcium carbonate, natural calcium carbonate, titanium oxide, magnesium oxide, iron phosphate, titanium carbide, titanium nitride, α- or β-silicon oxide, aluminum, calcium oxalate, iron, α-ferrous oxide, zinc, zinc dioxide, nickel (III) oxide, nickel, copper, chromia, magnesium hydroxide, zirconia, yttria, ceria, zircon, and antimony oxide.

Examples of the organic particles include those commercially available as organic matting agents, e.g., benzoguanamine-formaldehyde and polytetrafluoroethylene.

These organic or inorganic non-magnetic particles preferably have an average particle size of from 0.001 to 3 $\mu$m, and more preferably from 0.1 to 2 $\mu$m.

In order to prepare a support having a reduced coarse projection density, coarse particles may be removed by filtration through a multi-stage filter after addition of the above-described particles to a solution of starting materials of the support, but it is preferred that the particles to be added contain no coarse particles. From this viewpoint, preferred of the above-enumerated particles are titanium oxide, α- or β-silicon oxide, synthetic calcium carbonate, and organic fine particles. In the most preferred embodiment, particles having a size of from 0.1 to 1 $\mu$m are added in an amount of from 100 to 10,000 ppm, and those having a size of from 0.3 to 2.0 $\mu$m are added in an amount of from 50 to 10,000 ppm.

The filter, if used, preferably has an ability of trapping 90% or more of particles having a size of 5 $\mu$m. While the filter material is not limited, filters made of sintered fibers produce good results.

On the support is coated a magnetic layer containing a ferromagnetic substance, a binder, and, if desired, additives. If desired, a backing layer may be provided on the support on the side opposite to the magnetic layer. For details of the magnetic layer, the composition thereof, and the backing layer, reference can be made to JP-B-56-26890 (the term "JP-B" as used herein means an "examined published Japanese patent application") and U.S. Pat. No. 4,135,016 which is incorporated herein by reference.

In general, a magnetic recording medium comprising the above-described support having thereon a magnetic layer has a thermal shrinkage of 1% or less.

With respect to the composition of the magnetic layer, methods for producing magnetic recording media, and the like, descriptions of JP-B-56-26890 and U.S. Pat. No. 4,135,016 can be followed.

Ferromagnetic powders incorporated into the magnetic layer generally has a particle size (major axis diameter) of not more than 0.30 $\mu$m, preferably not more than 0.20 $\mu$m, and more preferably not more than 0.15 $\mu$m. A ratio of minor axis diameter to major axis diameter, i.e., an aspect ratio, is generally from 2 to 20. The term "major axis" as used herein means the longest of the three axes of a particle, and the term "minor axis" as used herein means the shortest.

Where the magnetic layer has a multi-layered structure composed of at least two magnetic layers, it is preferred that the ferromagnetic powder in the second layer has a smaller particle size than in the first layer.

The ferromagnetic powder generally has a BET specific surface area of from 25 to 80 $m^2/g$. In the case where the magnetic layer has a multi-layered structure, the particles of the second layer preferably have a larger specific surface area than in the first layer.

The ferromagnetic powder generally has a crystallite size of from 100Å to 450Å, and preferably from 150Å to 400Å. In the case where the magnetic layer has a multi-layered structure, the ferromagnetic powder in the second layer preferably has a smaller crystallite size than in the first layer.

The ferromagnetic powder generally has a coercive force (Hc) of from 500 to 1,800 Oe, and preferably from 500 to 1,200 Oe. In the case where the magnetic layer has a multi-layered structure, the Hc of the second layer is preferably higher than in the first layer.

The ferromagnetic powder generally has a saturation magnetization ($\delta s$) of not less than 50 emu/g, and preferably not less than 70 emu/g. Metallic fine powders as ferromagnetic powders preferably have a $\delta s$ of not less than 100 emu/g.

In using cobalt-doped iron oxide as ferromagnetic powder, a ratio of divalent iron to trivalent iron is preferably from 0 to 20%, and more preferably from 5 to 10%, and a cobalt to iron atomic ratio is generally from 0 to 15%, and preferably from 3 to 8%.

A pH of the ferromagnetic powder is preferably optimized according to a combination with a binder used. A suitable pH is from 4 to 12, and preferably from 6 to 10.

If desired, the ferromagnetic powder of at least one magnetic layer may be subjected to surface treatment, e.g., with Al, Si, P, or an oxide thereof.

Ferromagnetic powders which can be used in the present invention are known and include $\gamma$-FeO$_x$ (x: 1.33 to 1.5), Co-doped $\gamma$-FeO$_x$ (x: 1.33 to 1.5), ferromagnetic alloy fine powders comprising at least 75% of Fe, Ni or Co, barium ferrite, and strontium ferrite. These ferromagnetic powders may further contain other atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, St, and B.

Of the above-described ferromagnetic powders, ferromagnetic alloy fine powders may contain a small amount of a hydroxide or an oxide. Ferromagnetic alloy fine powders to be used can be prepared by any conventional process, such as a process comprising reducing a mixed organic acid salt (mainly an oxalate) with a reducing gas, e.g., hydrogen; a process comprising reducing iron oxide with a reducing gas, e.g., hydrogen to obtain Fe or Fe-Co particles; a process comprising thermally decomposing a metallic carbonyl compound; a process comprising adding to an aqueous solution of a ferromagnetic metal a reducing agent, e.g., sodium borohydride, a hypophosphite, and hydrazine to conduct reduction; or a process comprising evaporating a metal in a low pressure inert gas to obtain fine powders. The thus obtained ferromagnetic alloy powder may be subjected to a known slow-oxidation treatment, for example, a process comprising immersing the powder in an inorganic solvent followed by drying, a process comprising immersing the powder in an organic solvent, and introducing an oxygen-containing gas to form an oxidized film on the surface, followed by drying; or a process comprising forming an oxidized film on the surface by controlling partial pressures of oxygen gas and an inert gas without using an organic solvent.

The ferromagnetic powder to be used in the present invention preferably has a small void volume, e.g., not more than 20% by volume, and more preferably not more than 5% by volume.

Ferromagnetic powders which can be used in the present invention can be prepared by known processes. The shape of the ferromagnetic powders may be any of a needle-like form, a granular form, a grain forra, and a tabular form as far as the above-described particle size requirement is fulfilled.

Binders which can be used in either a single magnetic layer or a first or second layer of a multi-layered magnetic layer include known thermoplastic, thermosetting or reactive resins and mixtures thereof.

The thermoplastic resins generally have a glass transition temperature of from $-100°$ to $150°$ C., a number average molecular weight of from 1,000 to 200,000, and preferably from 10,000 to 100,000, and a degree of polymerization of from about 50 to about 1,000.

Specific examples of the thermoplastic resins include polymers or copolymers containing, as a constituting unit, vinyl chloride, vinyl acetate, vinyl alcohol, maleic acid, acrylic acid, acrylic esters, vinylidene chloride, acrylonitrile, methacrylic acid, methacrylic esters, styrene, butadiene, ethylene, vinyl butyral, vinyl acetal, vinyl ethers, etc., polyurethane resins, and various rubber resins.

Examples of the thermosetting resins or reactive resins include phenolic resins, epoxy resins, polyurethane curing resins, urea resins, melamine resins, alkyd resins, acrylic reactive resins, formaldehyde resins, silicone resins, epoxypolyamide resins, a mixture of a polyester resin and an isocyanate prepolymer, a mixture of a polyester polyol and a polyisocyanate, and a mixture of a polyurethane resin and a polyisocyanate.

For details of these resins, reference can be made to *Plastic Handbook*, Asakura Shoten, Japan (1969).

Known electron radiation-curing resins may be used in the first or second magnetic layer. Examples of such resins and processes for producing the same are described in JP-A-62-256219.

The above-mentioned binder resins may be used either individually or in combination thereof. Preferred examples of the binders include a combination of at least one of vinyl chloride resins, vinyl chloride-vinyl acetate resins, vinyl chloride-vinyl acetate-vinyl alcohol resins, and vinyl chloride-vinyl acetate-maleic anhydride copolymers and a polyurethane resin, which may further be combined with a polyisocyanate.

Known polyurethane resins are useful, including polyester polyurethane, polyether polyurethane, polyether polyester polyurethane, polycarbonate polyurethane, polyester polycarbonate polyurethane, and polycaprolactone polyurethane.

If desired, dispersing properties and durability of these binder resins may be improved by introducing at least one polar group selected from —COOM, —SO$_3$M, —OSO$_3$M, —P=O(OM)$_2$, —O—P=O(OM)$_2$ (wherein M represents a hydrogen atom or an alkali metal base), —OH, —NR$^2$, —N$^+$R$^3$ (wherein R represents a hydrocarbon group), an epoxy group, —SH, —CN, etc. by copolymerization or addition reaction. Such a polar group is generally introduced in an amount of from $10^{-1}$ to $10^{-8}$ mol/g, and preferably from $10^{-2}$ to $10^{-6}$ mol/g.

The above-mentioned binders are commercially available under trade names of VAGH, VYHH, VMCH, VAGF, VAGD, VROH, VYES, VYNC, VMCC, XYHL, XYSG, PKHH, PKHJ, PKHC, and PKFE (products of Union Carbide Plastic Corp.); MPR-TA, MPR-TA5, MPR-TAL, MPR-TSN, MPR-TMF, MPR-TS, and MPR-TM (products of Nisshin Kagaku Kogyo K.K.); 1000W, DX80, DX81, DX82, and DX83 (products of Electro Chemical Industry Co., Ltd.); MR110, MR100, and 400X110A (products of Nippon Geon Co., Ltd.); Nippollan N2301, N2302 and N2304 (products of Nippon Polyurethane Industry Co., Ltd.); Pandex T-5105, T-R3080, and T-5201, Burnock D-400 and D-210-80, and Crisvon 6109 and 7209 (products of Dai-Nippon Ink & Chemicals, Inc.); U Vylon R8200, UR8300, RV530 and RV280 (products of Toyo Spinning Co., Ltd.); Daiteranine 4020, 5020, 5100, 5300, 9020, 9022, and 7020 (products of Dainichiseika Colour & Chemical Mfg. Co., Ltd.); MX5004 (product of Mitsubishi Chemical Industries, Ltd.); Sanprene SP-150 (product of Sanyo Chemical Industries Co., Ltd.); and Saran F310 and F210 (products of Asahi Chemical Industry Co., Ltd.).

The binder is generally used in an amount of from 5 to 50% by weight, and preferably from 10 to 30% by weight, based on the ferromagnetic powder in a single magnetic layer or a first or second layer of a multi-layered magnetic layer. In using a combination of a vinyl chloride resin, a polyurethane resin, and a polyisocyanate, they are preferably used in an amount of from 5 to 30%, from 2 to 20%, and from 2 to 20%, respectively, based on the total amount of the mixture of them.

Polyurethane resins to be used as a binder preferably have a glass transition temperature of from $-50°$ to 100° C., an elongation at break of from 100 to 2,000%, a stress at rupture of from 0.05 to 10 kg/cm$^2$, and a yield point of from 0.05 to 10 kg/cm$^2$.

Examples of polyisocyanates used as a binder include isocyanates, e.g., tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate; reaction products between these isocyanates and a polyalcohol; and polyisocyanates produced by condensation of the isocyanate. These isocyanates are commercially available under trade names of Collonate L, Collonate HL, Collonate 2030, Collonate 2031, Millionate MR, and Millionate MTL (products of Nippon Polyurethane Industry Co., Ltd.); Takenate D-102, Takenate D-110N, Takenate 200, and Takenate D-202 (products of Takeda Chemical Industries, Ltd.); and Desmodur L, Desmodur IL, Desmodur N, and Desmodur HL (products of Sumitomo Bayer Co., Ltd.).

Carbon black which can be used in the present invention include furnace black for rubbers, thermal black for rubbers, carbon black for coloring, and acetylene black.

Carbon black to be used preferably has a specific surface area of from 5 to 500 m$^2$/g, a DBP oil absorption of from 10 to 400 ml/100 g, a particle size of from 5 to 300 m$\mu$, a pH of from 2 to 10, a water content of from 0.1 to 10%, and a tapped density of from 0.1 to 1 g/cc.

Commercially available carbon black products which can be utilized in the present invention include BLACK PEARLS 2000, 1300, 1000, 900, 800, and 700, and VULCAN XC-72 (products of Cabot Co.); #80, #60, #55, #50, and #35 (products of Asahi Carbon K.K.); #2400B, #2300, #900, #1000, #30, #40, and #10B (products of Mitsubishi Chemical Industries, Ltd.); and CONDUCTEX SC, and RAVEN 150, 50, 40, and 15 (products of Columbian Carbon Co.).

The carbon black may be subjected to surface treatment with a dispersing agent, etc., or may be graft-modified with a resin, or a part of the surface of carbon black may be graphitized. The carbon black may be previously dispersed in a binder before addition to a magnetic coating composition.

The above-described carbon black species may be used either individually or in combination in the first or second layer of a multi-layered magnetic layer. Carbon black is preferably used in an amount of from 0.1 to 30% by weight based on the ferromagnetic powder in the first or second magnetic layer.

Carbon black serves for prevention of static charge, reduction of a coefficient of friction, production of a light screening effect, and improvement of film strength, though depending on the species used. Accordingly, the kind, amount, and combination of the carbon black to be used may be altered between the first layer and the second layer according to the use, taking the above-described characteristics such as particle size, oil absorption, conductivity, and pH into consideration. For example, carbon black having high conductivity may be used in the first layer to prevent static charge, and carbon black having a large particle size may be used in the second layer to reduce a coefficient of friction.

For details of carbon black species which can be used in the present invention, reference can be made, e.g., to *Carbon Black Binran* (Carbon Black Handbook) edited by Carbon Black Kyokai, Japan (1971).

Abrasives which can be used in the present invention include known abrasives having a Mohs hardness of 6 or more, e.g., $\alpha$-alumina having an s-conversion of 90% or more, $\beta$-alumina, silicon carbide, chromium oxide, cerium oxide, $\alpha$-iron oxide, corundum, artificial diamond, silicon nitride, titanium carbide, titanium oxide, silicon dioxide, and boron nitride, etc. and combinations thereof. Composite abrasives, i.e., abrasives having been surface-treated with other abrasives, may also be employed. While some of these abrasives contain compounds or elements other than the main component, the effects are equal as long as the main component content is 90% or more. A preferred particle size of the abrasive is from 0.01 to 2 $\mu$m. If desired, two or more abrasives differing in grain size may be used in combination, or the same effects can be obtained by using a single abrasive having a broadened size distribution. The abrasive to be used preferably has a tapped density of from 0.3 to 2 g/cc, a water content of from 0.1 to 5%, a pH of from 2 to 11, and a specific surface area of from 1 to 30 m$^2$/g.

The abrasive is not limited in grain shape and may have a needle-like shape, a spherical shape, or a cubic shape. Those having an angular part are preferred for their high abrading action.

Examples of commercially available abrasives which can be used in the present invention are AKP-20, AKP-30, AKP-50, and HIT-50 (products of Sumitomo Chemical Co., Ltd.); G5, G7, and S-1 (products of Nippon Chemical Industrial Co., Ltd.); and 100ED and 140Ed (products of Toda Kogyo K.K.).

Control of distribution of the abrasive can be experimentally obtained by combining the kind of an abrasive, the composition of a solvent, drying conditions, and the stage of addition of the abrasive.

The abrasive may be previously dispersed in a binder, and the resulting abrasive paste and then dispersed in a magnetic coating composition.

Where the magnetic layer has a multi-layered structure, the effects of the present invention can be achieved with more ease by using the abrasive in the first layer in a higher amount than in the second layer.

Other additives which can be used in the present invention include additives for endowing the magnetic layer with lubricating effects, antistatic effects, dispersing effects, and plasticizing effects. Examples of the additives include molybdenum disulfide, tungsten disulfide, graphite, boron nitride, fluorinated graphite, silicon oil, polar group-containing silicones, fatty acid-modified silicones, fluorine-containing silicones, fluorine-containing alcohols, fluorine-containing esters, polyolefins, polyglycols, alkyl phosphates and alkali metal salts thereof, alkyl sulfates and alkali metal salts thereof, polyphenyl ethers, fluorine-containing alkyl sulfates and alkali metal salts thereof, saturated or unsaturated and straight chain or branched monobasic fatty acids containing from 10 to 24 carbon atoms and metal salts thereof (e.g., Li, Na, K or Cu salts), saturated or unsaturated and straight chain or branched mono-, di-, tri-, tetra-, penta-, or hexa-hydric alcohols containing from 12 to 22 carbon atoms, alkoxyalcohols having from 12 to 22 carbon atoms, mono-, di- or tri-fatty acid esters obtained from a saturated or unsaturated and straight chain or branched monobasic fatty acid having from 10 to 24 carbon atoms and a saturated or unsaturated and straight chain or branched mono-, di-, tri-, tetra-, penta- or hexa-hydric alcohol having from 2 to 12 carbon atoms, fatty acid esters of monoalkyl ethers of an alkylene oxide polymer, fatty acid amides having from 8 to 22 carbon atoms, and aliphatic amines having from 8 to 22 carbon atoms.

Specific examples of these additives include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Nonionic surface active agents such as alkylene oxide type, glycerin type, glycidol type, and alkylphenol ethylene oxide adducts; cationic surface active agents such as cyclic amines, ester amides, quaternary ammonium salts, hydantoin derivatives, heterocyclic compounds, and phosphonium or sulfonium compounds; anionic surface active agents containing an acid group, such as a carboxyl group, a sulfo group, a phospho group, a sulfuric ester group, and a phosphoric ester group; and amphoteric surface active agents such as amino acids, aminosulfonic acids, sulfuric or phosphoric esters of amino alcohols, and alkyl betaines may also be used.

For details of these surface active agents, reference can be made to *Kaimen Kasseizai Binran* (Surface Active Agent Handbook), Sankyo Tosho K.K., Japan (1960).

These lubricants, antistatic agents or the like additives do not need to be 100% pure and may contain impurities such as isomers, unreacted substances, byproducts, decomposition products, oxidation products, etc., preferably in a proportion of not more than 30% by weight, and more preferably not more than 10% by weight.

Organic solvents which can be used for forming a magnetic coating composition in the present invention include ketones, e.g., acetone, methyl ethyl ketone, methyl isobutyl ketone, diisobutyl ketone, cyclohexanone, isophorone, and tetrahydrofuran; alcohols, e.g., methanol, ethanol, propanol, butanol, isobutyl alcohol, isopropyl alcohol, and methylcyclohexanol; esters, e.g., methyl acetate, butyl acetate, isobutyl acetate, isopropyl acetate, ethyl lactate, and glycol acetate; glycol ethers, e.g., glycol dimethyl ether, glycol monoethyl ether, and dioxane; aromatic hydrocarbons, e.g., benzene, toluene, xylene, cresol, and chlorobenzene; chlorinated hydrocarbons, e.g., methylene chloride, ethylene chloride, carbon tetrachloride, chloroform, ethylene chlorohydrin, and dichlorobenzene; N,N-dimethylformamide; and hexane.

These organic solvents do not need to be 100% pure and may contain impurities, e.g., isomers, unreacted materials, by-products, decomposition products, oxidation products, water, etc., preferably in a proportion of not more than 30% by weight, and more preferably not more than 10% by weight.

In the case of forming a multi-layered magnetic layer, the kind or amount of the organic solvent may be, if desired, altered between the first and second layers. For example, a highly volatile solvent is used in the first layer to improve surface properties; or a solvent having a high surface tension (e.g., cyclohexanone and dioxane) is used in the first layer to improve coating stability; or a solvent having a high solubility parameter is used in the second layer to increase degree of packing. These examples of solvent usage are for illustrative purposes only but not for limitation.

In the magnetic recording medium according to the present invention, the non-magnetic support generally has a thickness of from 1 to 100 $\mu$m, and preferably from 6 to 20 $\mu$m; and the magnetic layer generally has a thickness of from 0.5 to 10 $\mu$m, and preferably from 1 to 5 $\mu$m. In the case of a multi-layered magnetic layer, the second magnetic layer generally has a thickness of not greater than 1.5 $\mu$m, preferably not greater than 1.0 $\mu$m, and more preferably not greater than 0.5 $\mu$m. The thickness of the magnetic layer or layers is generally within a range of from 1/100 to 2 times that of the non-magnetic support.

If desired, intermediate layers, such as a subbing layer for improving adhesion between a non-magnetic support and a first magnetic layer and a carbon black-containing layer for static charge prevention, may be provided. These intermediate layers each generally has a thickness of from 0.01 to 2 $\mu$m, and preferably from 0.05 to 0.5 $\mu$m. Further, a back coat layer may be formed on the non-magnetic support on the side opposite to the magnetic layer. The back coat layer generally has a thickness of from 0.1 to 2 $\mu$m, and preferably from 0.3 to 1.0 $\mu$m. Conventional intermediate layers and back coat layers may be used in the present invention.

A magnetic coating composition for forming a magnetic layer is prepared through at least a kneading step and a dispersing step, and, if desired, a mixing step before or after the kneading step or dispersing step. In these steps, free use can be made of conventionally known techniques. In the kneading step, a kneading machine having a powerful kneading force, such as a continuous kneader and a pressure kneader, can be employed.

For details of the kneading step, reference can be made to JP-A-1-106388 and JP-A-1-79274. In the case of forming a multi-layered magnetic layer, the second magnetic layer preferably has a thickness of not more than 1.5 $\mu$m as stated above. To this effect, a simultaneous coating method as described in JP-A-62-212933 is preferably adopted. If a successive coating method in which a first layer is first coated and, after drying, a second layer is coated thereon is followed, coating defects would be produced, making it substantially difficult to form a multi-layered magnetic layer with the second layer having the above-described preferred thickness.

In the present invention, the surface profile of a non-magnetic support is evaluated over a large measuring area of 500 m$^2$, and the density of coarse projections in that area is controlled to 400 or less, preferably 200 or less, while allowing fine projections to be present so as to have an Ra of from 0.02 to 0.07 $\mu$m, thereby making electromagnetic conversion characteristics and running properties consistent with each other. In other words, projections contributing to high-frequency output variations of a magnetic layer are reduced, and the fine projections permit of presence of air so that the magnetic tape undergoes no deformation even if tightening takes place during winding. Further, since the non-magnetic support has a thermal shrinkage of not more than 1% after preserved at 100° C. for 4 hours, satisfactory dimensional stability is assured, and expansion and contraction of the tape can be reduced, which further ensures consistency between electromagnetic conversion characteristics and running properties. Furthermore, in a preferred embodiment, the crystallite size and coercive force of the ferromagnetic powder used are set at certain levels thereby providing a magnetic recording medium having a smooth surface and a high output.

The present invention is now illustrated in greater detail with reference to Examples, but it should be understood that the present invention is not deemed to be limited thereto. All the percents, parts and ratios are by weight unless otherwise indicated.

EXAMPLE 1

A magnetic coating composition having the following formulation was coated on a 13 μm thick polyethylene terephthalate support having varied characteristics as shown in Table 1 below. After drying, the coated film was calendered and slit to prepare audio compact cassette tape samples (designated Samples 1 to 21).

| Magnetic Coating Composition Formulation: | |
| --- | --- |
| Co-Doped ferromagnetic powder (Hc: 850 Oe; specific surface area: 35 m$^2$; crystallite size: 350 Å; aspect ratio: 8) | 300 parts |
| Phospho-containing vinyl chloride copolymer | 30 parts |
| Polyurethane resin | 20 parts |
| Polyisocyanate | 10 parts |
| Carbon black | 8 parts |
| Abrasive (α-Al$_2$O$_3$) | 5 parts |
| Lecithin | 3 parts |
| Lauric acid | 3 parts |
| Oleic acid | 3 parts |
| Butyl acetate | 100 parts |
| Methyl ethyl ketone | 150 parts |

EXAMPLE 2

A magnetic coating composition for a first layer was prepared from the following components.

| First Magnetic Layer Coating Composition: | |
| --- | --- |
| Co-Doped iron oxide powder Hc: 600 Oe; specific surface area: 30 m$^2$/g; crystallite size: 400 Å; particle size (major axis): 0.25 μm; aspect ratio: 10) | 100 parts |
| Vinyl chloride-vinyl acetate-maleic anhydride (86:13:1) copolymer (degree of polymerization: 400) | 10 parts |
| Polyester polyurethane resin | 5 parts |
| Carbon black (particle size: 0.05 μm) | 3 parts |
| α-Alumina (particle size: 0.3 μm) | 10 parts |
| Butyl stearate | 1 part |
| Stearic acid | 2 parts |
| Butyl acetate | 200 parts |

The following components for a second magnetic layer composition were kneaded in a kneader and dispersed in a sand mill.

| Second Magnetic Layer Coating Composition | |
| --- | --- |
| Co-Doped iron oxide powder (Hc: 700 Oe; specific surface area: 35 m$^2$/g; crystallite size: 350 Å; particle size (major axis): 0.20 μm; aspect ratio: 12) | 100 parts |
| Vinyl chloride-vinyl acetate-maleic anhydride (86:13:1) copolymer (degree of polymerization: 400) | 12 parts |
| Polyester polyurethane resin (containing 10$^{-4}$ mol of COOH—/g) | 6 parts |
| α-Alumina (particle size: 0.3 μm) | 3 parts |
| Carbon black (particle size: 0.10 μm) | 3 parts |
| Butyl stearate | 1 part |
| Stearic acid | 2 parts |
| Butyl acetate | 200 parts |

A polyisocyanate was added to the resulting dispersion, and 40 parts of butyl acetate was further added thereto, followed by filtration through a filter having an average pore size of 1 μm to prepare a coating composition for a second layer.

The coating compositions for first and second layers were coated on a 12 μm thick polyethylene terephthalate support having varied characteristics as shown in Table 1 below by reverse-roll coating to a dry thickness (dried at 80° C.) of 4.0 μm. The coated magnetic layer was oriented while wet with a cobalt magnet having a magnetic force of 3,000 G and a solenoid having a magnetic force of 1,500 G. After drying, the magnetic film was calendered at 90° C. by means of a 7-stage calendar and slit to prepare audio compact cassette tape samples (designated Samples 22 to 28).

The surface profile and thermal shrinkage of the supports used in Samples 1 to 28 were measured according to the following test methods, and the results obtained are shown in Table 1.

1) Coarse Projection Density

Figure 2:
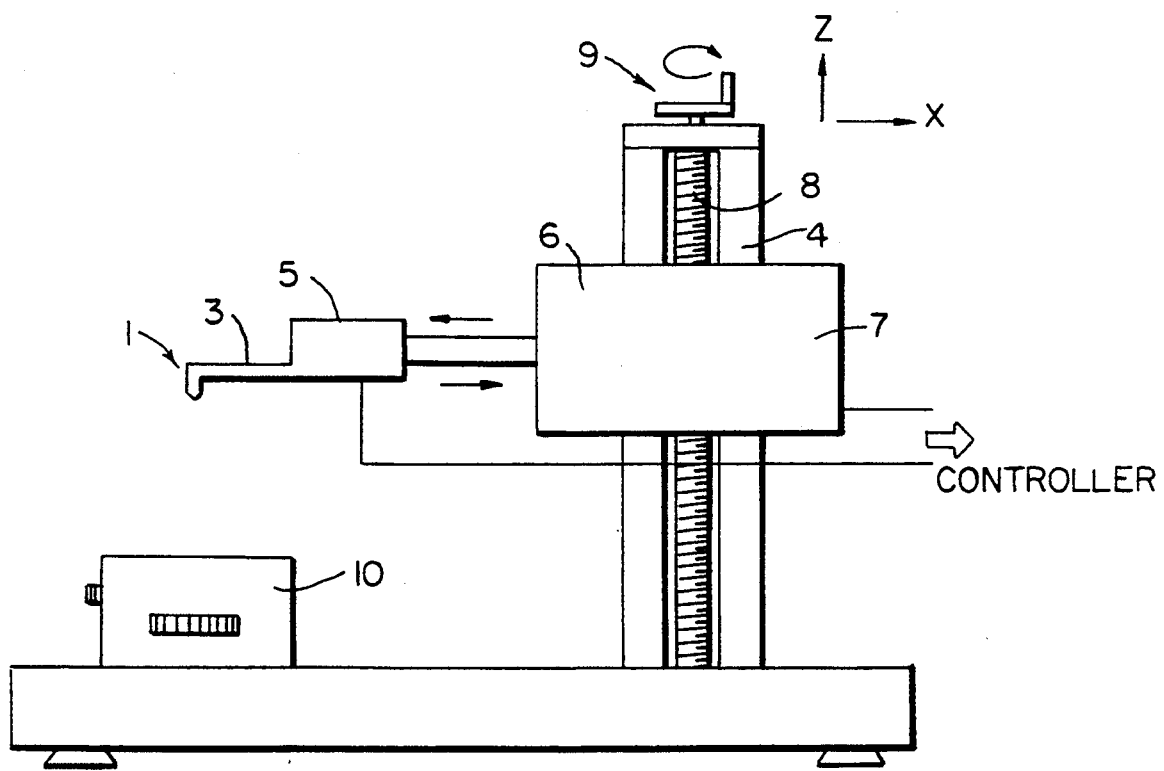
FIG. 2 is a schematic side view of a surface roughness tester equipped with the probe of FIG. 1.

A knife wedge probe shown in FIG. 1 (wedge width: 1 mm; straightness: ±0.1 μm) was set on a three-dimensional roughness tester shown in FIG. 2. The polyethylene terephthalate support film was tented over a holder shown in FIG. 3 (diameter of base block: 110 mm), and the holder was mounted on stage 10.

The surface of the film was scanned to obtain 10 roughness curves under the following conditions, and a histogram of the height of coarse projections was prepared from the three-dimensional roughness charts. The terminology "coarse projections" as used herein means surface projections having a height of sextuple ring or higher in multiple interference observation where the height corresponding to single ring multiple interference observation is 0.273 μm.

| | |
| --- | --- |
| X-axis travel: | 50 mm |
| Y-direction scanning pitch: | 1 mm |
| Z-axis magnification: | × 10,000 |
| Scanning speed: | 0.6 mm/sec |

2) Surface Roughness Ra

Surface roughness Ra was calculated in accordance with JIS B0601 by the use of "SR-3AK" manufactured by Kosaka Kenkyusho under the following conditions.

| | |
| --- | --- |
| Cut-off value: | 0.25 mm |
| Measuring length: | 1 mm × 40 times = 40 mm |
| Z-axis magnification: | × 20,000 |

3) Thermal Shrinkage

The support was allowed to stand at 100° C. for 4 hours, and the rate of dimensional change before and after the heat treatment was determined.

Performance properties of Samples 1 to 28 were evaluated in accordance with the following test methods. The results obtained are also shown in Table 1.

a) Sensitivity

Sensitivity at 315 Hz was measured with "Nakamichi 582" manufactured by Nakamichi K.K. and was relatively expressed taking that of a magnetic recording tape "QP-12" produced by BASF A.G. as a standard.

b) Frequency Characteristics

A difference in output between 10 KHz and 315 Hz was determined.

c) High-frequency Output Variation:

Signals of 10 KHz and −20 dB were recorded on the sample, and the width of variation in reproduced output was read out.

d) Rate of Running Stop

The sample in a cassette shell was allowed to stand at 100° C. for 4 hours and then run on 20 commercially available automobile cassette tape decks for consecutive 24 hours, and the occurrence of running stop was measured.

e) Running properties under Normal Conditions

In order to simulate friction with a magnetic head during running under normal conditions, a coefficient of friction with a Permalloy rod was measured under conditions of 23° C., 60% RH (relative humidity), a 180° wrap, and a load of 50 g. The results were judged according to the following rating system:

A ... $\mu_D < 0.15$
B ... $\mu_D = 0.15$ to $0.19$
C ... $\mu_D > 0.19$

Samples 1 to 8

The coarse projection density and thermal shrinkage of the support fell in the respective range of the present invention.

Ra was varied from 0.018 to 0.077 μm. As shown in Table 1, with an Ra of less than 0.020 μm, running properties under normal conditions were poor, and the rate of running stop was high. With an Ra of from 0.020 to 0.030 μm, running properties under normal conditions were improved up to the level "B". With an Ra of more than 0.030 μm, running properties under normal conditions reached a satisfactory level. However, an Ra exceeding 0.07 μm proved unfavorable because the frequency characteristics became less than 2.0 dB.

Samples 9 to 12

The Ra and thermal shrinkage fell in the respective range of the present invention, while the coarse projection density was varied from 10 to 680.

It can be seen that high-frequency output variation has no relation to Ra but to coarse projections.

Samples 13 to 15

The coarse projection density and Ra fell within the respective range of the present invention, while the thermal shrinkage was varied from 0.6 to 1.5%.

It can be seen from Table 1 that there arose no problem as far as the thermal shrinkage was within 1.0%, whereas the rate of running stop reached 20% if the thermal shrinkage exceeded 1.0%.

TABLE 1

| Sample No. | Coarse Projection Density (/500 m²) | Ra (μm) | Thermal Shrinkage (%) | Relative Sensitivity (dB) | Frequency Characteristics (dB) | High-Region Output Variation (dB) | Rate of Running Stop (%) | Running Properties under Normal Conditions |
|---|---|---|---|---|---|---|---|---|
| 1 | 0 | 0.018 | 0.7 | +1.1 | +2.9 | 0.0 | 15 | C |
| 2 | 0 | 0.022 | 0.8 | +1.2 | +2.9 | 0.0 | 0 | B |
| 3 | 5 | 0.032 | 0.7 | +1.1 | +2.7 | 0.0 | 0 | A |
| 4 | 11 | 0.043 | 0.7 | +1.2 | +2.5 | 0.0 | 0 | A |
| 5 | 10 | 0.054 | 0.8 | +1.2 | +2.3 | 0.0 | 0 | A |
| 6 | 28 | 0.065 | 0.7 | +1.1 | +2.0 | −0.1 | 0 | A |
| 7 | 126 | 0.068 | 0.8 | +1.1 | +2.0 | −0.4 | 0 | A |
| 8 | 181 | 0.077 | 0.8 | +1.2 | +1.9 | −0.5 | 0 | A |
| 9 | 10 | 0.036 | 0.7 | +1.2 | +2.6 | 0.0 | 0 | A |
| 10 | 185 | 0.052 | 0.7 | +1.1 | +2.3 | −0.5 | 0 | A |
| 11 | 231 | 0.048 | 0.7 | +1.2 | +2.4 | −0.7 | 0 | A |
| 12 | 680 | 0.044 | 0.7 | +1.1 | +2.4 | −1.7 | 0 | A |
| 13 | 5 | 0.045 | 0.6 | +1.2 | +2.5 | 0.0 | 0 | A |
| 14 | 16 | 0.045 | 0.8 | +1.2 | +2.5 | −0.1 | 0 | A |
| 15 | 11 | 0.045 | 1.5 | +1.2 | +2.5 | 0.0 | 20 | A |
| 16 | 32 | 0.017 | 2.2 | +1.2 | +2.9 | −0.1 | 75 | C |
| 17 | 335 | 0.025 | 2.5 | +1.2 | +2.9 | −0.8 | 50 | B |
| 18 | 418 | 0.031 | 2.6 | +1.1 | +2.7 | −1.1 | 40 | A |
| 19 | 750 | 0.056 | 2.5 | +1.2 | +2.3 | −2.0 | 40 | A |
| 20 | 891 | 0.063 | 2.7 | +1.1 | +2.1 | −2.4 | 40 | A |
| 21 | 1224 | 0.075 | 2.5 | +1.1 | +1.9 | −3.4 | 35 | A |
| 22 | 0 | 0.031 | 0.7 | +1.5 | +2.9 | 0.0 | 0 | A |
| 23 | 7 | 0.038 | 0.7 | +1.4 | +2.8 | 0.0 | 0 | A |
| 24 | 22 | 0.042 | 0.8 | +1.4 | +2.7 | −0.1 | 0 | A |
| 25 | 129 | 0.041 | 0.7 | +1.5 | +2.7 | −0.3 | 0 | A |
| 26 | 186 | 0.042 | 0.8 | +1.4 | +2.7 | −0.4 | 0 | A |
| 27 | 234 | 0.040 | 0.7 | +1.5 | +2.8 | −0.6 | 0 | A |
| 28 | 672 | 0.041 | 0.7 | +1.5 | +2.7 | −1.4 | 0 | A |

Characteristic properties of the support used and considerations on the test results of the tape samples are described below.

Samples 16 to 21

In these samples, a commercially available polyester film having an Ra of from 0.017 to 0.075 μm was used. The results of Table 1 reveal that a magnetic recording medium satisfying all the test items cannot be obtained with any of these commercially available polyester films.

With respect to coarse projection density, the following conclusion can be derived from the results of Samples 1 through 21. At a density of up to 200/500 m², the high-frequency output variation is on a satisfactory level of not more than −0.5 dB. At a density of up to 400/500 m², the variation is within an acceptable level (B) of not more than −1.0 dB. However, if a density exceeds 400/500 m², the variation width is −1.0 dB or more, indicating poor reproduction of the high-frequency region.

Samples 22 to 28

These samples had a multi-layered magnetic layer. The factor of coarse projections was varied among the samples, with the Ra and thermal shrinkage falling within the respective range of the present invention. As is apparent, these samples showed surely increased sensitivity as compared with Samples 1 to 21 having a single magnetic layer, with the other performance properties being substantially equal.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having on one side thereof only one magnetic layer, said magnetic layer comprising a binder having dispersed therein a ferromagnetic powder and said non-magnetic support having a coarse projection density of from 5 to 400 per 500 mm², wherein said coarse projection is defined as a surface projection having a height of a sextuple ring or higher in a multiple interference observation, a surface roughness (Ra) of from 0.02 to 0.07 μm where the cut-off value is 0.25 mm, and a thermal shrinkage of not more than 1.0% when preserved at 100° C. for 4 hours.

2. A magnetic recording medium as claimed in claim 1, wherein said ferromagnetic powder has a crystallite size of from 100Å to 450Å and a coercive force Hc of from 500 to 1,800 Oe.

3. A magnetic recording layer as claimed in claim 1, wherein, said ferromagnetic powder is Co-doped iron oxide powder.

4. A magnetic recording layer as claimed in claim 2, wherein, said ferromagnetic powder is Co-doped iron oxide powder.

* * * * *